(12) United States Patent
Berthiaume et al.

(10) Patent No.: US 6,302,414 B1
(45) Date of Patent: Oct. 16, 2001

(54) MULTIPLE USE HAND TRUCKS FITTED WITH DETACHABLE BOTTLED WATER CARRIER TRAY AND METHODS OF THEIR CONSTRUCTION AND USE

(75) Inventors: William Berthiaume, Sterling; Bruce W. Law, Bay City; Kenneth A. Kukla, Essexville, all of MI (US)

(73) Assignee: Magline, Inc., Pinconning, MI (US)

( * ) Notice: Subject to any disclaimer, the term of this patent is extended or adjusted under 35 U.S.C. 154(b) by 0 days.

(21) Appl. No.: 09/280,471

(22) Filed: Mar. 30, 1999

Related U.S. Application Data
(60) Provisional application No. 60/080,355, filed on Apr. 1, 1998.

(51) Int. Cl.⁷ ........................................................ B62B 3/02
(52) U.S. Cl. ..................................... 280/47.18; 280/47.27; 280/79.6
(58) Field of Search ............................ 280/43.1, 43.11, 280/47.131, 47.15, 47.17, 47.18, 47.2, 47.21, 47.23, 47.24, 47.26, 47.27, 79.3, 79.5, 79.6

(56) References Cited

U.S. PATENT DOCUMENTS

| | | | |
|---|---|---|---|
| 2,763,383 | * 9/1956 | McCoy | 280/79.6 |
| 3,411,798 | * 11/1968 | Capadalis | 280/47.18 |
| 3,436,093 | * 4/1969 | Ruffley, Jr. | 280/79.3 |
| 3,785,669 | 1/1974 | Doheny . | |
| 3,873,118 | * 3/1975 | Takagi | 280/47.24 |
| 4,284,286 | 8/1981 | Lewallen . | |
| 4,418,969 | 12/1983 | Hettmann . | |
| 4,531,752 | 7/1985 | Diener . | |
| 4,802,681 | * 2/1989 | Hung | 280/47.18 |
| 5,104,135 | 4/1992 | Sheets . | |
| 5,228,716 | 7/1993 | Dahl . | |
| 5,476,282 | * 12/1995 | Dahl | 280/47.18 |
| 5,518,356 | * 5/1996 | Krawczyk | 280/47.18 |
| 5,536,034 | 7/1996 | Miller . | |
| 5,846,043 | * 12/1998 | Spath | 414/343 |
| 5,913,527 | * 6/1999 | Hailston | 280/47.28 |
| 6,019,381 | 2/2000 | Krawczyk . | |
| 6,053,515 | * 4/2000 | Kelley | 280/47.18 |

FOREIGN PATENT DOCUMENTS 1577963    2/1969  (FR) .

* cited by examiner

*Primary Examiner*—Lanna Mai
*Assistant Examiner*—Jeffrey J. Restifo
(74) *Attorney, Agent, or Firm*—Reising, Ethington, Barnes, Kisselle, Learman & McCulloch, P.C.

(57) ABSTRACT

A convertible hand truck is fitted with a beverage carrier tray when its in four-wheeled condition to support a plurality of bulk water containers. The tray may be detachable from the hand truck to facilitate usage of the hand truck for other purposes when not transporting the containers. The hand truck and/or tray is preferably fitted with upright end supports to provide stability to the stack of containers at the opposite ends of the stack. The end supports may be folded generally flush with the tray when not in use for compact storage.

19 Claims, 10 Drawing Sheets

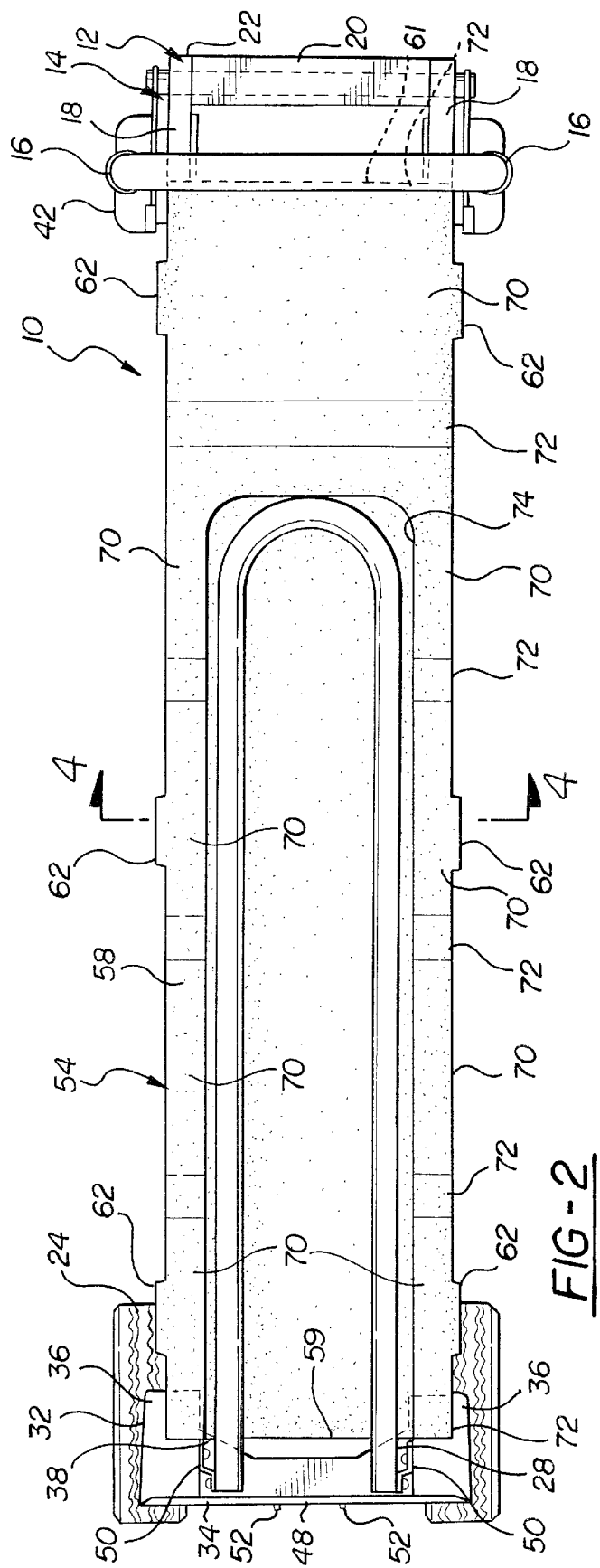
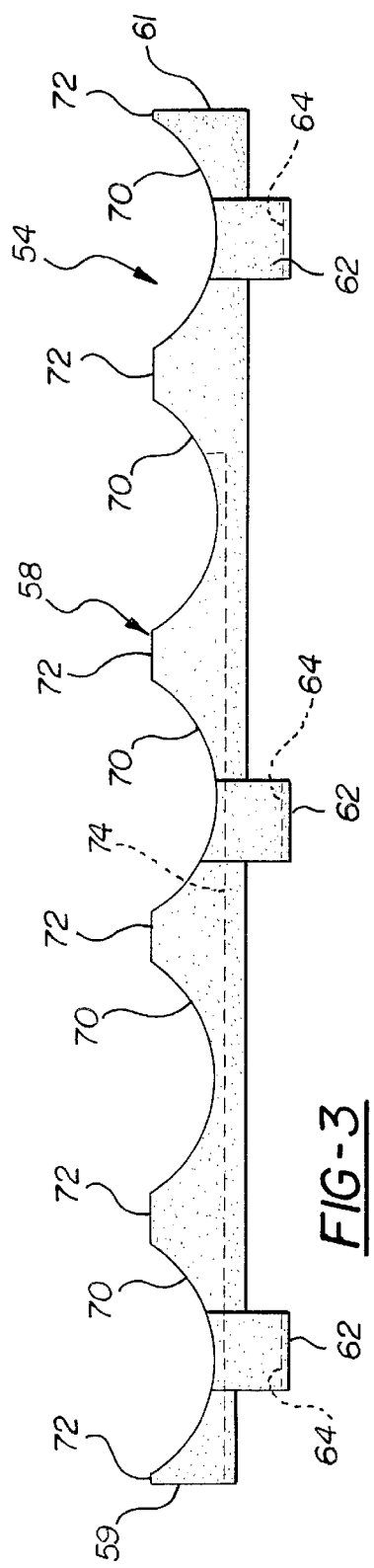
FIG-2
FIG-3

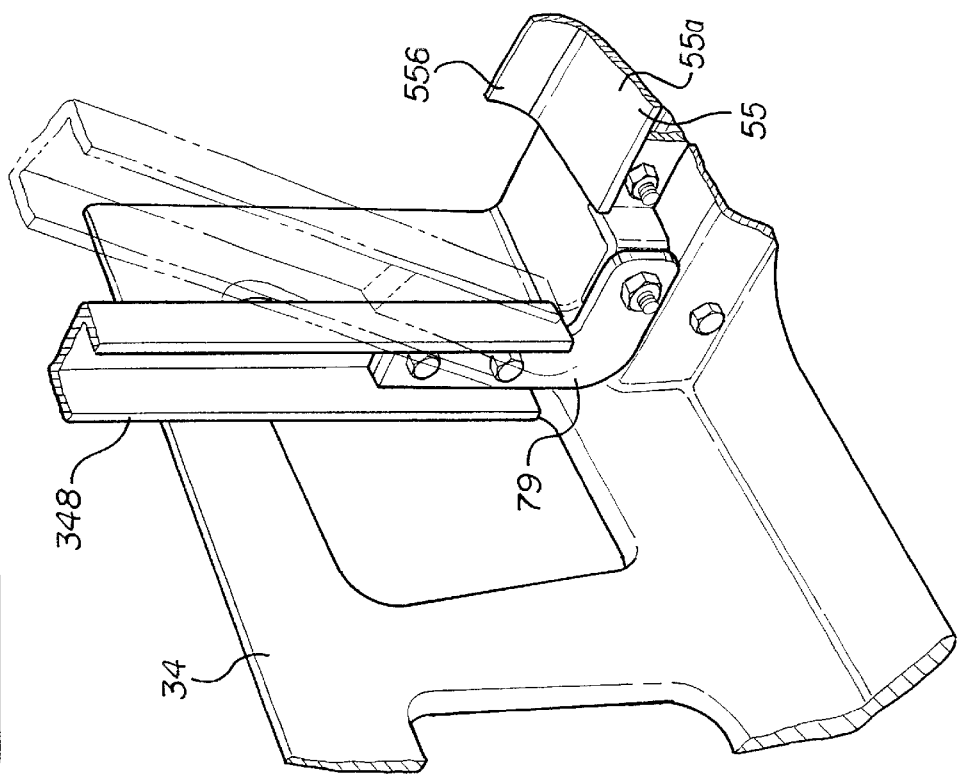
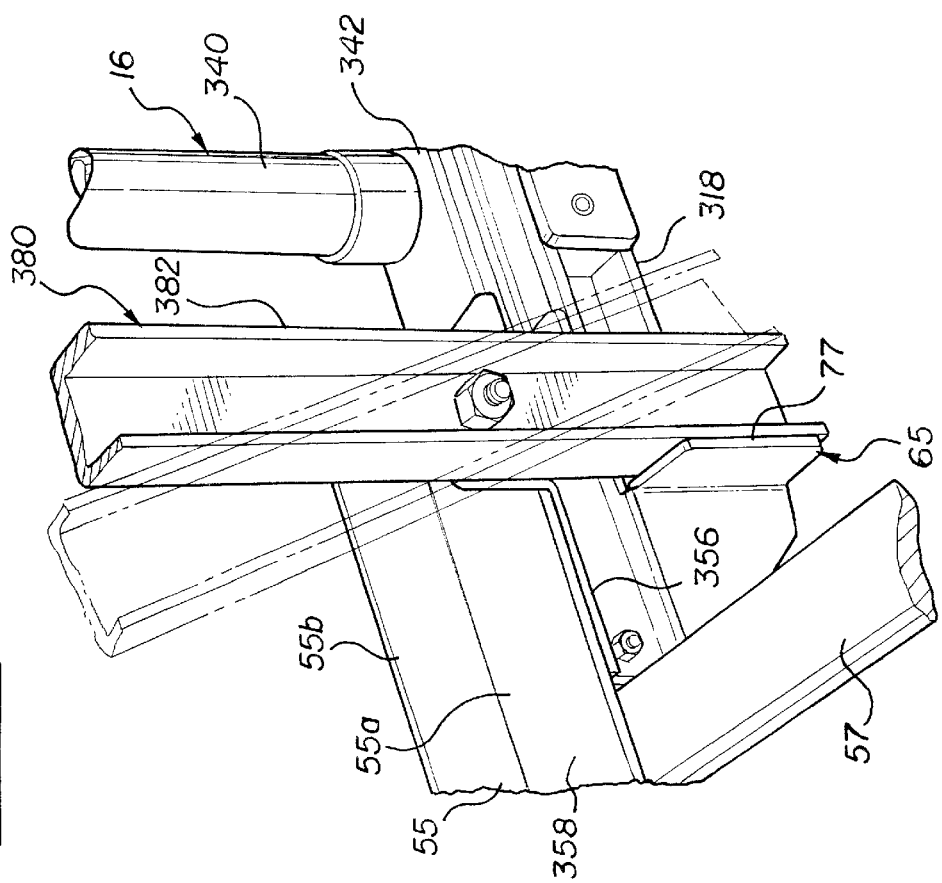

MULTIPLE USE HAND TRUCKS FITTED WITH DETACHABLE BOTTLED WATER CARRIER TRAY AND METHODS OF THEIR CONSTRUCTION AND USE

The disclosure incorporates the hand trucks and methods disclosed in provisional patent application No. 60/080,355, filed Apr. 1, 1998, whose priority is claimed for this application.

This invention relates generally to multiple-use hand trucks, and more particularly those adapted for transporting bottled water containers as well as for normal use.

BACKGROUND OF THE INVENTION

Drinking water is commonly packaged and sold in large glass or plastic bottles having volume capacities of about 5 gallons. The containers are very bulky and heavy, weighing about 50 lbs. each.

Because of their bulky size and weight, personnel who deliver these products find it convenient to use a hand truck when transporting these products from the delivery truck to the consumer's home or place of business. A conventional two-wheeled hand truck of the type having a single load-supporting nose piece projecting forwardly from the bottom of the frame can handle a single 5-gallon bottled water container. Another such two-wheeled hand truck is known in which multiple, foldable trays are provided that are pivoted to the side rails of the truck and which can be folded down to extend forwardly of the frame for carrying up to four bottled water containers on the hand truck.

Convertible bulk hand trucks are also known having a main frame and a foldable sub-frame that, when folded together, form a two-wheeled dolly device or hand truck and, that, when unfolded, form a four-wheeled cart as shown, for example, in U.S. Pat. Nos. 3,785,669; 4,921,270; and 5,536,034. When in the four-wheeled cart position, the horizontal main frame portion forms a flat, planar platform or bed for supporting cargo to be transported. It will be appreciated that while such a platform is well suited for supporting boxes and other objects with flat support surfaces, it would not be well suited for carrying cylindrical bottled water containers, as they would have a tendency to roll or shift about and be generally unstable.

SUMMARY OF THE INVENTION

The present invention is concerned with a convertible hand truck, usable in two-wheeled as well as four-wheeled configurations, which is fitted with a tray configured to support a plurality of bottled water containers in stable manner on the main frame of the truck when in the four-wheeled configuration.

According to another object of the invention, such a tray is constructed so as to be detachable from the hand truck, enabling the tray to be manufactured as a separate component, and enabling the hand truck to be used in conventional manner in its two and four-wheeled configurations when the tray is removed.

According to another object of the invention, the tray is designed to overlie and detachably mount to the main frame.

According to still a further object, the hand truck and/or tray is fitted with at least one and preferably a pair of upright end supports when the frame is in the four-wheeled configuration to support a stack of the containers on the tray.

According to a further object, the end wall or walls are hinged to the hand truck or tray and movable between a folded stowed position and the upright use position when in the four-wheeled configuration.

THE DRAWINGS

Presently preferred embodiments of the invention are disclosed in the following description and in the accompanying drawings, wherein:

FIG. 2 is a top plan view of the convertible hand truck of FIG. 1 shown with the containers removed and the supportive end wall folded to a stowed position;

FIG. 3 is an enlarged side elevational view of the tray only of FIG. 2;

FIG. 12 is an enlarged fragmentary perspective view showing the upright support for the front end wall of the tray of FIGS. 10 and 11;

FIG. 13 is an enlarged fragmentary perspective view showing the upright support mechanism for the back end wall of the tray;

DETAILED DESCRIPTION

Figure 1:
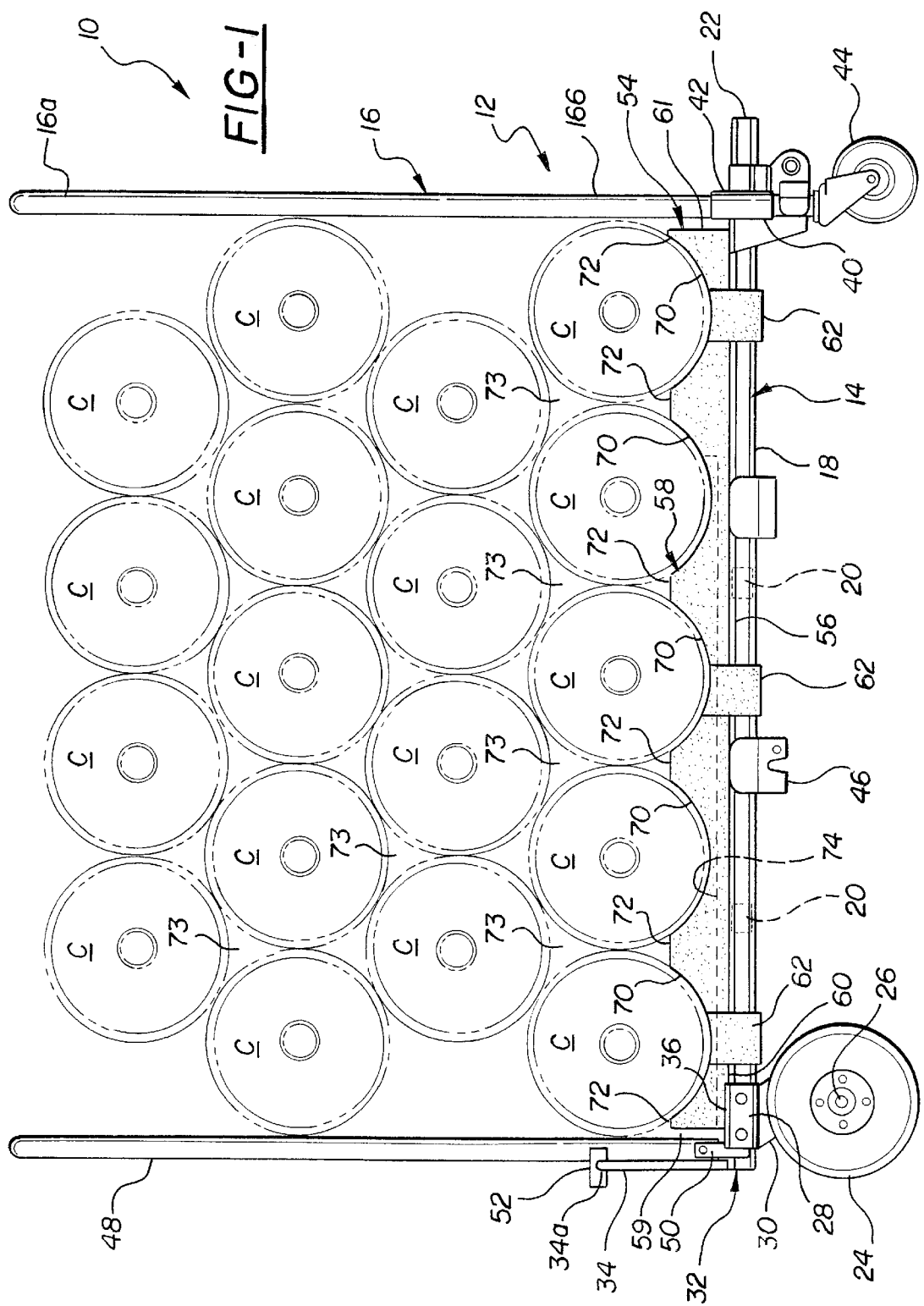
FIG. 1 is a side elevational view of a convertible hand truck mounting a bottle carrier tray constructed according to a first embodiment of the invention.
Figures 4, 5:
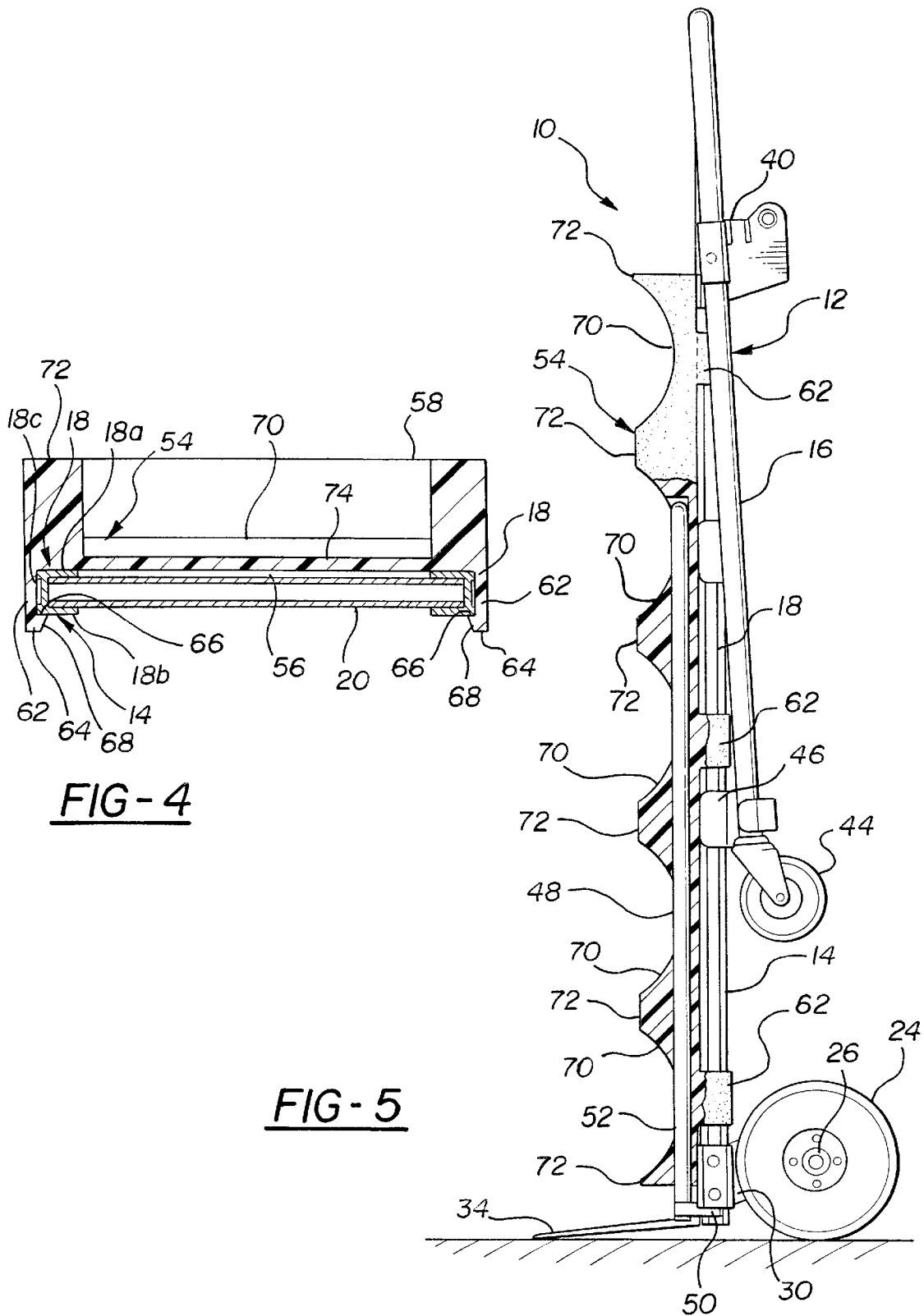
FIG. 4 is an enlarged cross-sectional view taken generally along the lines 4—4 of FIG. 2.
FIG. 5 is a side elevational view of the hand truck and tray of FIG. 1, shown in the two-wheeled configuration with the tray still attached to the main frame.

Referring now in more detail to the drawings, FIG. 1 illustrates a convertible bulk hand truck and bottle carrier tray assembly 10. The assembly 10 includes a convertible bulk hand truck 12 having an elongated main frame 14 and an elongated sub-frame 16 that is foldable with respect to the main frame 14. In the folded position shown in FIG. 5, the main frame 14 and sub-frame 16 form a two-wheeled dolly or hand truck configuration with the main frame 14 positioned generally vertically. The main frame 14 includes a pair of parallel, laterally spaced side rails 18, which are preferably channel-shaped metal extrusions opening laterally inwardly of the frame and including spaced apart front and back walls 18a, 18b, connected by a web 18c, as illustrated in FIG. 4. One or more cross braces or rails 20 extend laterally between and interconnect the side rails 18 at the head 22 of the main frame 14 and at predetermined locations along the length of the side rails 18, such that the cross braces 20 and side rails 18 constitute a rigid, fixed framework for the hand truck 12.

The truck 12 also includes a pair of primary wheels 24 fixed to opposite ends of an axle 26, which is in turn mounted to a base end 28 of the main frame 14 by brackets 30.

Projecting forwardly from the main frame 14 and forming a connecting part thereof, is an angle-shaped nose piece, generally designated 32, having a forwardly extending nose plate portion 34 generally perpendicular to the main frame 14, and mounting portions 36 secured to the lower ends of the side rails 18 and spaced to provide a recess 38 (FIG. 2) therebetween.

The sub-frame 16 is of the well known type comprising a generally U-shaped tubular member 40 having a head end 16a and a base end 16b connected by the well known sliding pivot linkages or mechanisms 42 adjacent the head 22 of the main frame 14. The mechanism 42 slidably couples the sub-frame 16 to the main frame 14 to permit main frame 14 to be shifted from a vertical position paralleling the sub-frame 16 when the hand truck 12 is in the two-wheeled folded position and the nose plate 34 is projecting generally horizontally forwardly of the main frame 14 as in FIG. 5, to a horizontal position in which the main frame 14 is generally perpendicular to the sub-frame 16 when the hand truck 12 assumes the four-wheeled position shown in FIG. 1. In this position the nose plate 34 extends generally vertically upwardly from the main frame 14, and the primary wheels 24 of the main frame 14 and a set of steerable secondary castor wheels 44 carried at the base end 16b of the sub-frame 16 are both in the ground-engaging positions.

As illustrated in FIG. 1, when the main frame 14 is horizontally disposed in the four-wheeled cart configuration, the sub-frame 16 is pivoted upright and locked in place by the usual latch mechanism 42 to provide a front end wall for the four-wheeled cart. When in the folded two-wheeled configuration, the U-shaped sub-frame member 16 is pivoted to a stowed latched position generally parallel to the side rails 18, as illustrated in FIG. 5, and functions to provide an extended hand truck handle.

The convertible hand truck thus far described in detail is conventional, and may be of the type disclosed, for example, in the aforementioned U.S. Pat. Nos. 3,785,669; 4,921,270; and 5,536,034, their disclosures being incorporated herein by reference.

The assembly 10 also includes a nose plate extension member or end support assembly 48 that serves as an opposite end wall of the hand truck when it is in the fore-wheeled configuration illustrated in FIG. 1. The extension member 48 of the first embodiment of FIGS. 1–5 preferably comprises an elongate U-shaped tubular piece pivoted at its ends to the main frame 14, and particularly to the nose piece 32, for movement between an extended position illustrated in FIG. 1 in which the member 48 extends in prolongation of the nose plate 34 and provides an upright end wall opposite the U-shaped sub-frame member 40 at the base end 28 of the main frame 14, and a stowed position (FIG. 5) in which the extension member 48 is folded against the main frame 14.

The ends of the extension member 48 are preferably coupled to the mounting portions 36 of the nose piece 32 by a set of L-shaped brackets 50 (FIG. 2). The brackets 50 are fixed, within the recess 38, to the inwardly facing surfaces of the mounting portions 36 of the nose piece 32, and have legs that project forwardly of the mounting portions 36 over the nose plate 34 so as to support the ends of the extension member 48 somewhat outwardly and forwardly of the side rails 18 in order to accommodate their folding against the frame when stowed.

The extension member 48 carries at least one and preferably two latch members 52 that are positioned to engage a forward free edge 34a of the nose plate 34 when the extension member 48 is moved to the four-wheeled upright position, so as to lock the extension member 48 releasably to the nose plate thereby securing the extension member in the upright position and against inward folding so that the member 48 may serve as a rigid, upright push handle which an operator may use to push the cart about.

The assembly 10 includes a bottle carrier tray, generally indicated at 54, provided on the main frame 14 for supporting a plurality of bottled water containers C typically of the large 5-gallon type, in predetermined positions on the frame 14, and preferably in horizontally extending side-by-side crosswise relation to the frame 14, as illustrated in FIG. 1 when the assembly 10 is in the four-wheeled cart configuration.

The carrier tray 54 is preferably formed as a separate component from the hand truck 12 and in such manner that it may be selectively attached to the main frame 14 as needed to facilitate the transport of such containers C, and readily detached as desired to enable the truck 12 to be used in the conventional manner to transport other types of cargo, such as boxes and the like.

As illustrated best in FIGS. 2–4, the carrier tray 54 preferably comprises an elongate tray member having a lower surface 56 which engages and is supported by the main frame 14, and an upper surface generally indicated at 58 that is contoured to support the containers C in their predetermined abutting positions (see FIG. 1). As shown in FIGS. 1 and 2, the tray 54 has a predetermined length, dimensioned relative to the truck 12, to extend between the upright end wall provided by the sub-frame 16 and the upstanding nose plate 34 when positioned on the main frame 14. The width of the tray 54 is dimensioned such that the lower surface 56 of the tray spans and rests upon the side rails 18. The lower surface 56 of the tray 54 is formed with a step 60 at the end thereof adjacent the nose piece 32 to accommodate the mounting portions 36 of the nose piece 32, thereby providing full contact support to the tray 54 along its length.

A plurality of retaining or latch arms 62 project downwardly from the tray 54 alongside the side rails 18 and confront the rails 18 to retain the tray 54 against lateral movement relative to the main frame 14. As shown best in FIG. 4, the arms 62 are formed preferably as an integral, unitary portion of the tray structure from the same material, although the invention contemplates that the arms 62 could be separately formed from the same or different material and be suitably attached to the tray 54 to serve the same purpose. Means are provided on the arms 62 for releasably locking the tray 54 to the frame 14 to restrain the tray 54 against separation from the frame 14 during the normal course of use. One way of securing the tray 54 releasably to the frame 14 is to provide the inwardly projecting locking flanges 64 shown on the lower free ends of the retaining arms 62. These flanges 64 have ledges 66 (FIG. 4) that underlie the side rails 18, when the tray 54 is attached, to secure the tray 54 against upward movement relative to the frame 14. The flanges 64 have camming surfaces 68 that engage the side rails 18 during installment of the tray 54. The latch arms 62 are preferably somewhat flexible such that upon pressing the tray 54 against the frame 14, the camming surfaces 68 deflect the flanges 64 and arms 62 laterally of the frame 14 until such time as the flanges 64 pass by the side rails 18, whereupon the arms 62 spring back to their original undeflected condition to locate the ledges 66 beneath the rails 18. To detach the tray 54, an operator may manually flex the arms 62 out of locked engagement with the rails 18 and lift the tray 54 free of the frame 14.

The contoured upper surface 58 of the tray 54 includes a plurality of transversely extending troughs or recesses 70 in the form of acurate depressions separated by ridges or crests 72. The arcuate recesses 70 are sized to support the containers C against lateral movement in the lengthwise direction of the frame 14. In the preferred construction, the recesses 70 lie along a circle having the same or slightly larger diameter as that of the outer diameter of the containers C, and are spaced so as to support the containers C in close proximity to one other such that laterally adjacent containers C touch or nearly touch one another when supported on the tray, as illustrated in FIG. 1, to provide upper V-shaped seats 73 between adjacent containers C for the overlying row of containers C. It will be appreciated that the recesses 70 could have shapes other than semi-circular, such as V-shaped or U-shaped configurations, the walls of which engage the container C and support them against rolling or shifting on the frame 14.

The upper surface 54 may further be formed with an elongate well 74 extending longitudinally from the base end 59 of the tray 54 adjacent the nose piece 43 toward the opposite end 61 to receive the nose plate extension handle member 48 when it is folded to the stowed position. As illustrated in FIGS. 2 and 5, the well 74 advantageously enables the tray 54 to remain attached to the frame 14 when the hand truck 12 is in the two-wheeled dolly configuration to provide for compact storage of the hand truck without requiring disassembly of the tray 54 from the truck 12. Of course, the tray 54 may be removed if desired, to facilitate normal two-wheeled usage of the truck 12.

The well 74 is preferably formed as a depression, although the well 74 could be formed as a cut-out portion of the tray, which would enable the extension member 48 to fold flush with the frame 14.

The tray 54 may be fabricated of a number of materials, including blow molded plastics, structural reinforced plastics, structural foam, wood, metal, and the like, as well as others which provide a fairly rigid structure. According to the preferred method of constructing the trays 54, the above materials may be formed according to conventional molding practices to provide trays that are of a size and shape suitable for releasable attachment to the particular hand truck frames 14 they are to be mounted on, with the recesses 70 formed in the upper surfaces of the trays 54 for supporting the containers C.

In operation, the hand truck 12 is constructed in the usual manner and fitted with the pivoting extension member 48 according to the invention. The tray 54 is separately formed in the manner described above. To support a load of containers C on the hand truck 12, the truck 12 is manipulated to the four-wheeled cart configuration of FIG. 1 and the tray 54 locked by latch arms 62 into position on the main frame 14. A first course or layer of containers C may then be placed in the recesses 70 as shown in FIG. 1, such that they extend transversely of the main frame 14 adjacent in side-by-side relation, and are retained against lateral movement by the cradling walls of the recess 70. Another layer of containers C may then be stacked in abutting relation upon the first layer by positioning them in the V-shaped seats 73 formed between the adjacent containers C as a result of their curvature. The seats 73 stabilize the second layer of containers against lateral movement in similar fashion to the recesses 70 of the tray 54. In the same way, a third layer of containers C may be stacked in abutting relation upon the second layer in respective seats 73 thereof, with the outermost ones of the containers abutting and being supported by the upstanding cart end walls provided by the upright sub-frame member 16 and nose plate extension member 48. As shown in FIG. 1, still a fourth layer of containers may be stacked in abutting relation upon the third layer in the same fashion as the second layer, and so on, limited only by the height of the end walls 16, 48, and the load capacity of the truck frame 14. By way of example, FIG. 1 shows 18 5-gallon containers loaded on the hand truck 12 and supported in stable manner by the tray 54 and end walls 16, 48.

When not in use, the truck 12 may be folded to the two-wheeled configuration shown in FIG. 5. Advantageously, the tray 54 of the first embodiment is constructed such that it does not have to be dismounted from the frame 14 when converting the truck 12 to the two-wheeled configuration. To convert the hand truck 12, the user simply unlocks the latch members 52 from the nose plate 34 and pivots the extension member 48 toward the main frame 14, whereupon the extension member 48 is received within the well 74 of the tray 54 in the stowed position along the main frame 14. The sub-frame 16 may then be folded to its stowed position so as to extend along the main frame 14 without interference from the tray 54.

If desired, the tray 54 can be bodily dismounted from the main frame 14 to accommodate normal usage of the hand truck 12 in both the two-wheeled and four-wheeled configurations.

Figure 6:
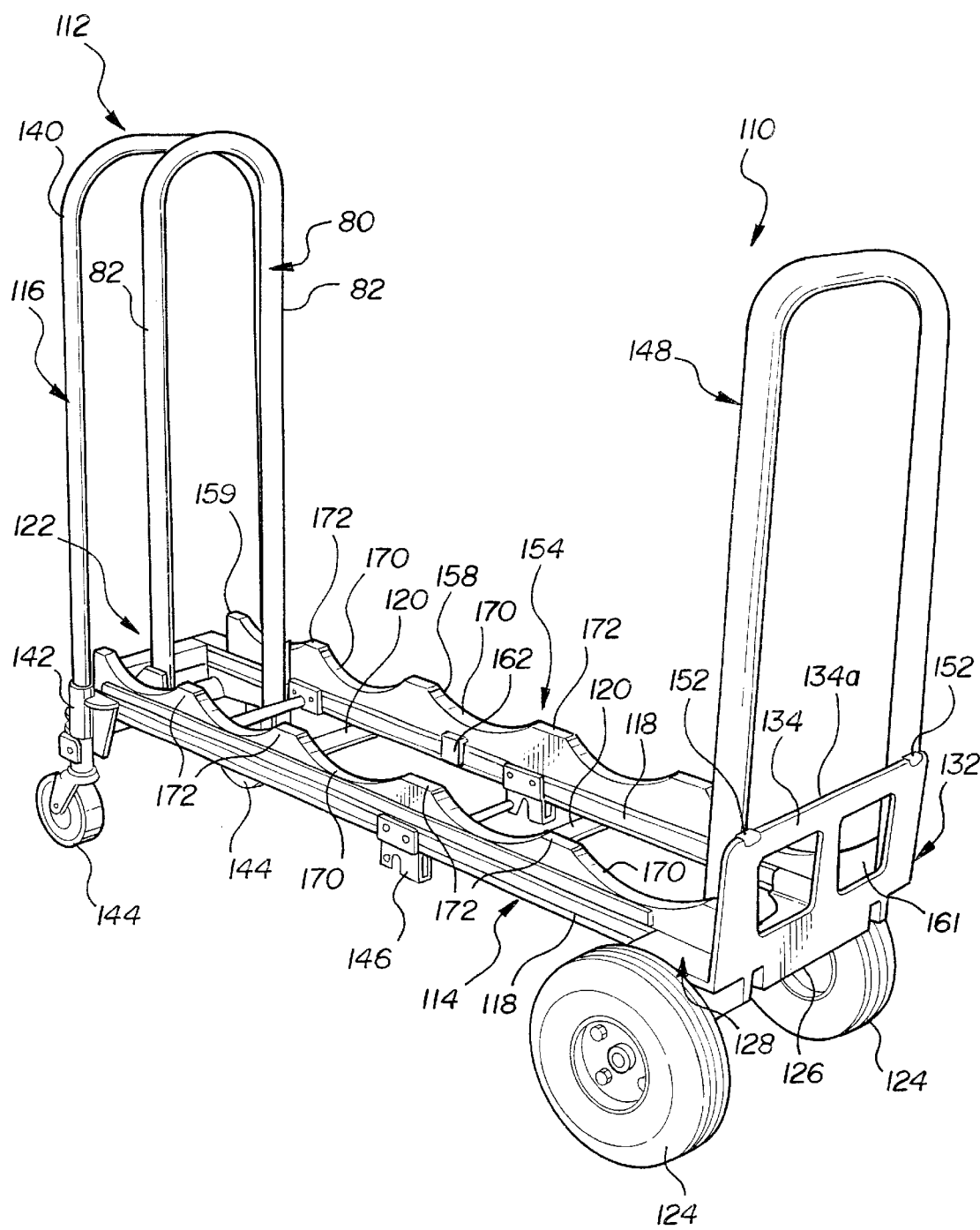
FIG. 6 is a rear elevational view of a convertible hand truck in a four-wheeled cart configuration in combination with a bottle carrying tray constructed according to a second embodiment of the invention.
Figure 7:
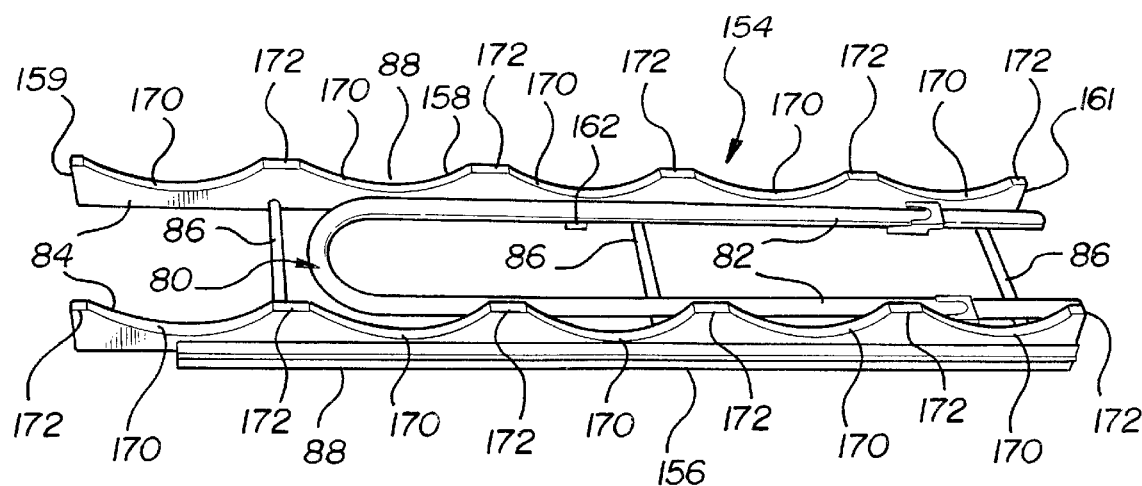
FIG. 7 is a perspective plan view of the tray of FIG. 6, shown detached from the hand truck and with an end wall folded to a stowed position.

FIGS. 6 and 7 illustrate an alternative embodiment of the invention wherein corresponding reference numerals are used to identify the corresponding structure or components of the first embodiment but are offset numerically by a figure of 100. Shown is a tray 154 of similar construction to the tray 54 of the first embodiment, with the principle distinction being that the tray 154 includes a supplemental end wall 80 that is hinged to the end 161 of the tray 154 inwardly of the sub-frame 116 when the sub-frame 116 is locked in the upright four-wheeled condition. The wall 80 comprises a generally U-shaped member whose legs 82 are spaced closer together than the legs of the U-shaped sub-frame member 116 so as to engage the containers C more centrally inwardly from their ends. The end wall 80 is somewhat longer than the sub-frame 16 when in the upright position. In this way, the end wall 80 is caused to confront the sub-frame 16 when fully upright, and is also supported against outward pivoting, as illustrated in FIG. 6. FIG. 6 shows the end wall 80 generally upright but slightly forward of contact with the sub-frame 16. In practice, the containers C have molded ribs adjacent their ends that define annular recesses, and the legs 82 of the end wall 80 are spaced so as to engage the containers at the location of the recesses between the ribs. As illustrated in FIG. 7, the end wall 80 may be folded flush with the tray 154 when not in use.

It will be appreciated that the end wall 48 at the other end of the cart described in connection with the first embodiment may alternatively be coupled to the tray 154 in the same manner as end wall 80 as shown, rather than to the nose plate. The latches 52 could still be carried by the end wall 48 for engagement with the end 34a of the nose plate 34 in order for member 48 to serve as a push handle as well.

Another distinction between the second and first embodiments is that the tray 154 includes a pair of laterally spaced bottle rack strips 84 that may be constructed of plastic, wood, metal, or any other material that is suitably rigid. Strips 84 may be joined by cross braces or rods 86 of a length to locate the racks 154 preferably inwardly of the side rails 18 of the main frame 14 for purposes of location of the container recesses. Longitudinal side extensions 88 may be secured to the outer sides of the racks 154 for engaging the tops of the side rails 18 and supporting the tray 154 on the main frame 14. The side extensions 88 may be formed as one piece with the racks 154 or, as illustrated, may comprise lengths of angle stock, bolted or otherwise secured to the sides of the rack strips 84.

The tray 154 further differs in that the retaining latch arms 162 extend downwardly from the racks 84 on the interior sides of the side rails 118 rather than on the exterior of the rails. The arms 162 may likewise be secured in any suitable manner to the main frame 114, preferably in a manner that enables the tray 154 to be detached from the frame 114 if desired.

Figure 8:
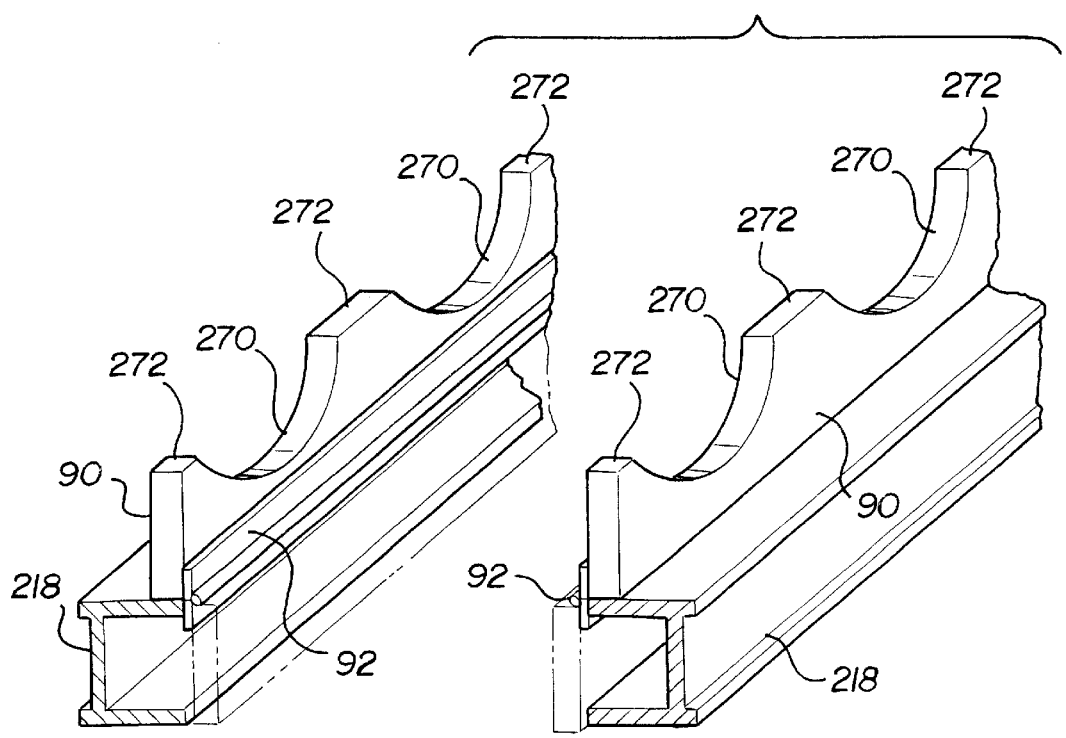
FIG. 8 is an enlarged fragmentary perspective view, shown partly in section, of another alternative hand truck having integrated fold-down bottle-carrying tray elements.
Figure 9:
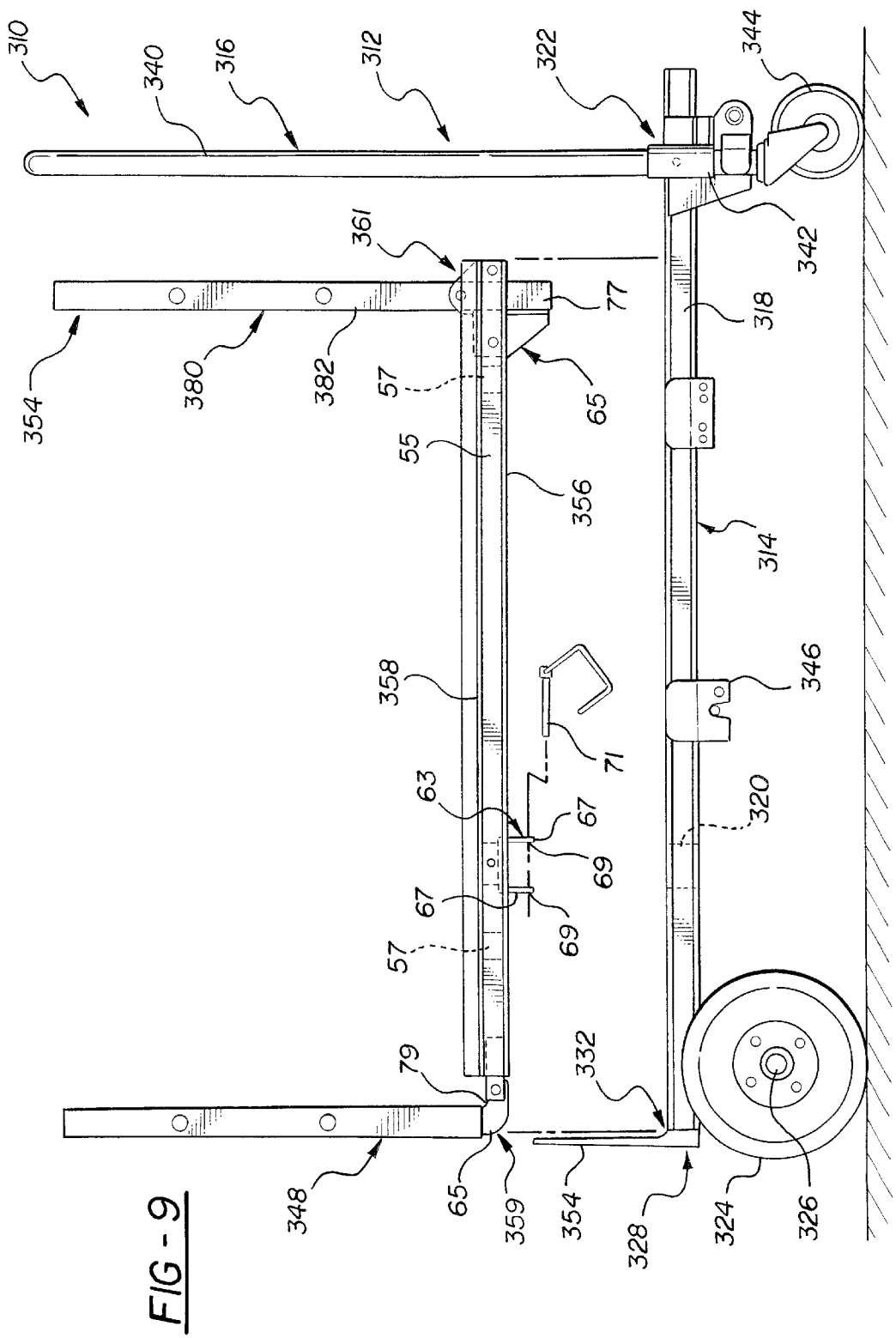
FIG. 9 is an exploded side elevational view of a hand truck and tray according to yet another embodiment of the invention.

FIG. 8 illustrates yet another embodiment of the invention wherein corresponding reference numerals are used to indicate like parts, but are numerically offset by a figure of 200. Shown in the figure is a transverse section of the main frame 214 of the hand truck 212 having rack strips 90 similar to the rack strips 84 that extend the length of the truck side rails 218 and are fastened by hinges 92 to the side rails 218. As illustrated in FIG. 8, the racks 90 are movable between the upright use position shown in solid lines for supporting containers in the acurate recesses 270 when the hand truck 12 is in the four-wheeled cart configuration, and an inwardly folded stowed position, shown in broken chain lines in FIG. 8, when the racks 90 are not in use in either the two-wheeled or four-wheeled positions. When in the stowed position, the racks 90 are positioned at or below the front faces of the truck side rails 218.

FIGS. 9–15 illustrate yet a further embodiment of the invention wherein corresponding references numerals are used to identify the corresponding structure or components of the first embodiment but are offset numerically by a figure of 300.

Figures 14, 15:
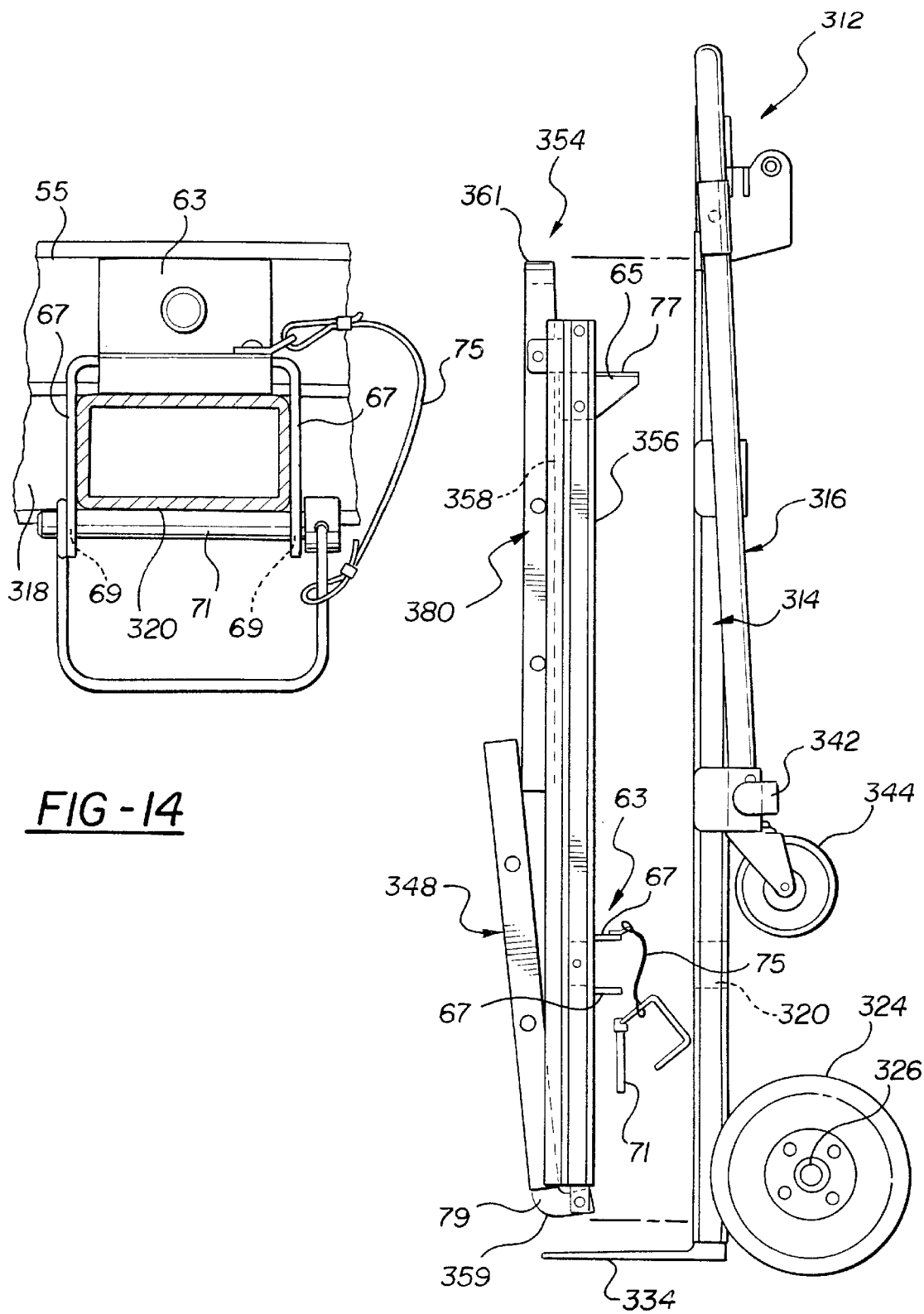
FIG. 14 is an enlarged fragmentary sectional view through the cross-bar of the hand truck mainframe, illustrating the operation of the latching mechanism of the tray.
FIG. 15 is a side elevational view showing the tray detached from the hand truck and both folded to a stowed position.

Shown is a conventional convertible hand truck 312 whose main frame 314 includes the laterally spaced side walls 318 joined intermediate its ends by cross member 320. The hand truck 312 is shown in combination with a detachable bottle carrier tray 354 constructed according to the alternative embodiment of the invention. The tray 354 comprises a rigid frame structure and extends longitudinally between the base and head ends of the main frame 314 and includes an upright end wall 348 at its base end adjacent the nose plate 334 and an end wall 380 adjacent the head of the main frame, both end walls of which are carried by the tray 354 and preferably pivotal between the upright, generally vertical positions shown in FIGS. 9 and 10 and in solid lines in FIGS. 12 and 13 in which the end walls or end supports extend generally perpendicularly upwardly from the frame structure of the tray 354. When not in use, the end supports 348, 380 are foldable inwardly of one another to positions generally parallel with the frame structure of the tray 354 when not in use, as illustrated in FIG. 15.

Figure 11:
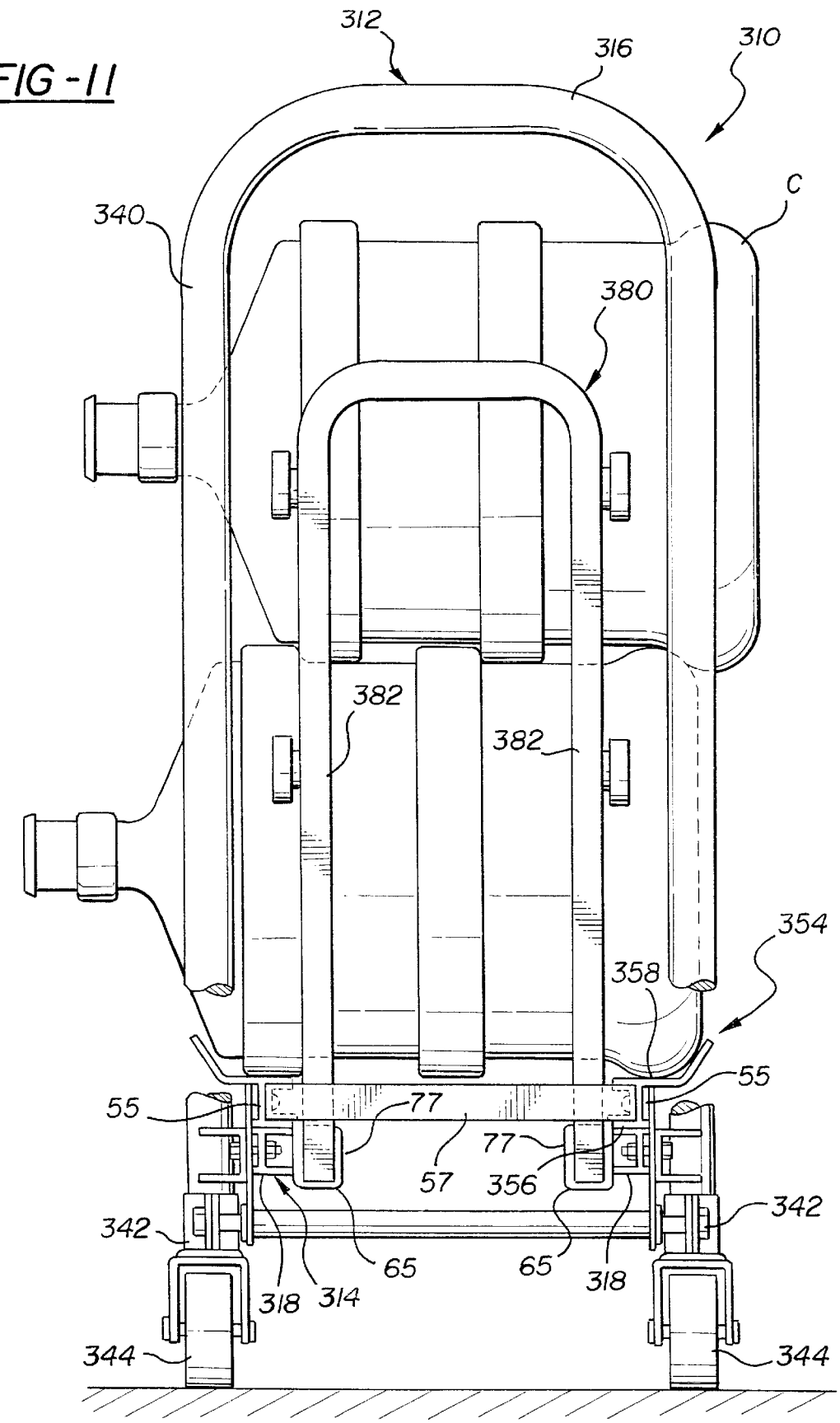
FIG. 11 is an enlarged end view taken generally along the lines 11—11 of FIG. 10.

The frame structure of the tray 354 includes contoured side rail members 55 extending longitudinally between the ends of the tray spaced laterally so as to overlie the side rails 318 of the main frame 314 when supported thereon as shown best in FIG. 11. The side rails 55 of the tray preferably comprise extruded members formed with laterally inwardly facing channels which are open to receive a pair of laterally extending cross pieces 57 adjacent the opposite ends of the rails joining them together to provide a rigid frame structure. An upper wall 55a of the side rails 55 are preferably contoured to provide an upturned retaining lip 55b extending the length of the side rails 55 for engaging and restraining the bottle containers C in the lateral direction to support the lower course from shifting in the lateral direction off the rails 55 of the tray 354, as best illustrated in FIG. 11.

The frame structure of the tray 354 carries a set of retaining brackets 63 adjacent the base end which extend below the side rails 55 of the tray 354 and confront the side rails 318 of the main frame 314 to support the tray 354 against lateral shifting on the main frame 314. Another set of pivot brackets 65 is carried by the frame structure of the tray 354 adjacent the opposite end near the head of the main frame 314 and likewise extend below the frame structure and confront the main frame side rails 18 to further that end of the tray against lateral shifting on the main frame 314. As shown best in FIGS. 9–12 and 14, the brackets 63, 65 are carried on the laterally inboard side of the tray side rails 55 and confront the inboard surfaces of the main frame side rails 318 to secure the tray 354 against lateral movement relative to the main frame 314.

The retaining brackets 63 have a downwardly opening U-shaped configuration with spaced side walls 67 that straddle the cross bar 320 of the main frame 314 to restrain the tray 354 in the longitudinal direction on the main frame 314. As shown best in FIG. 14, the free ends of the side wall 67 extend preferably below the cross brace 320. At least one of the brackets and preferably both have aligned apertures 69 in the exposed free ends of the side walls to accommodate, a locked end 71 that, when installed in the aperture 69, extends beneath the cross brace 320 and secures the tray 354 in releasably locked relation on the main frame 314. The lock pin 71 may be conveniently tethered to the tray 354 by a flexible lanyard 75.

The other set of brackets 65 at the opposite end of the tray 354 additionally serve to pivot the end support 380 to the frame structure of the tray 354, enabling it to be moved between the folded and upright positions. The brackets 65 further present a shoulder or stop 77 disposed in the path of the end support 380 in such position as to confront the end support 380 when moved to the upright position to limit its outward pivoting movement beyond the upright position, as shown best in FIG. 12. As also shown best in FIG. 12, the stop 77 may take the form of a flange projecting laterally inwardly from the bracket 65 into the path of the end support 380 when in the upright position.

The end support 348 at the base end of the tray is coupled by an L-shaped bracket 79 to the side rails 55 of the tray 354, supporting the end wall 348 for movement between the upright and folded positions. The retaining brackets 63 serve to orient the tray 354 on the main frame 314 in such manner as to position the end supports 348 closely adjacent the nose plate 334, such that the end support 348 confronts the nose plate 334 when moved to the upright position to limit its outward movement beyond that point. The stop 77 and nose plate 334 thus provide structure for supporting the end supports 380 and 348 against outward pivoting movement beyond their upright positions. Support against inward folding of the end supports once in the upright position is achieved by the containers C. As shown best in FIG. 10, the spacing between the end supports 348, 380 is equal to a multiple of the diameter of the containers, four of which are shown in the illustrated example. The lateral spacing between the legs of the end supports 348, 380 is less than the spacing of the legs of the sub-frame 316, and preferably corresponding to the spacing of recesses in the containers C, or about 8–10 inches.

Figure 10:
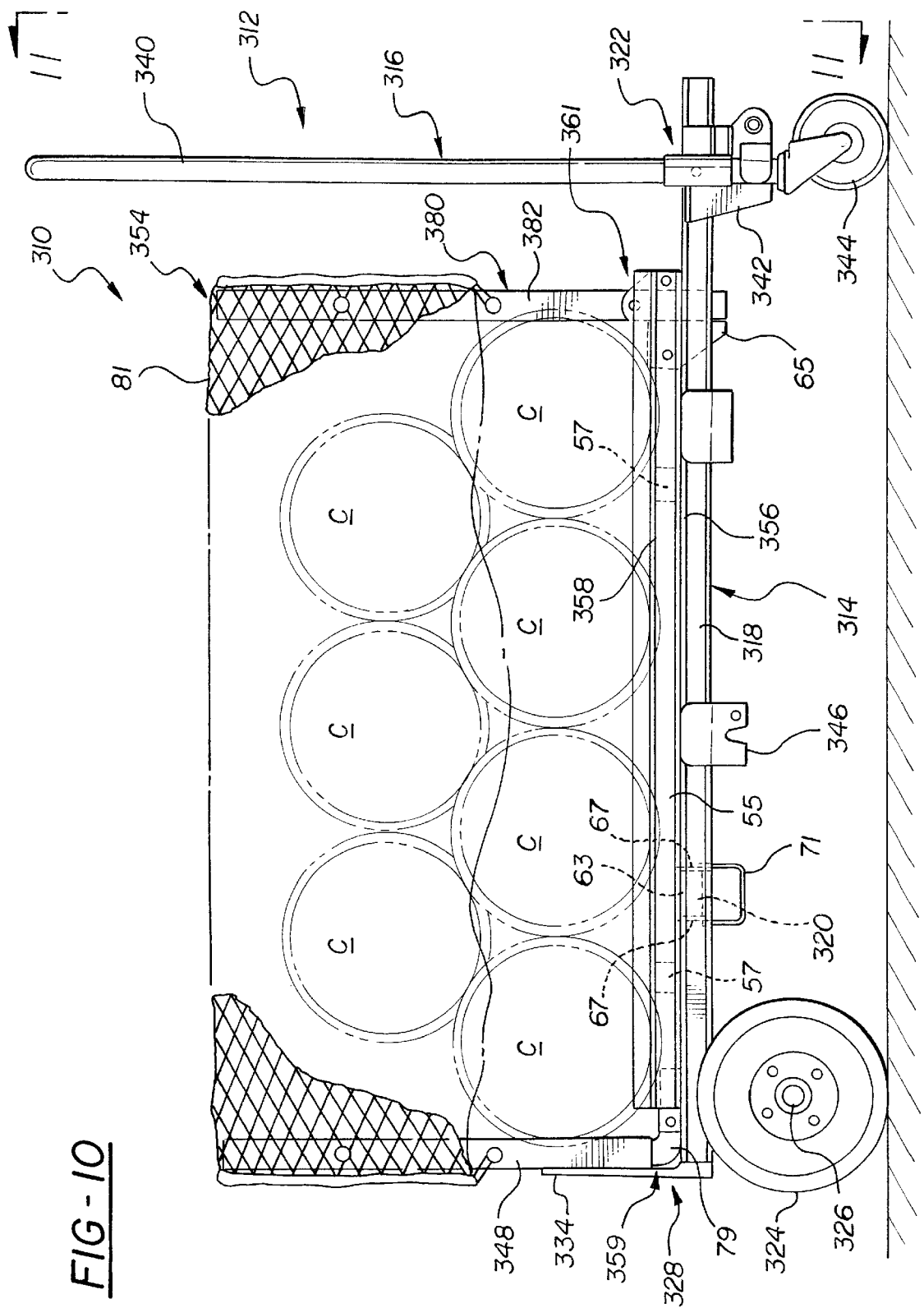
FIG. 10 is a side elevational view like FIG. 9 but showing the tray mounted on the cart and supporting a stack of containers.

The use of the FIGS. 9–15 embodiment of the tray is similar to that of the previous embodiments wherein containers are stacked in courses and restrained laterally and longitudinally by the tray to provide stability to the load. FIG. 10 shows an optional cargo net 81 that may be secured to the end supports 348, 380 and draped over the stack of containers C to provide further stability to the load.

When not in use the tray 354 may be dismounted from the hand truck 312 by releasing the lock pin 71 allowing the tray 354 to be lifted free of the hand truck, and the tray 354 and hand truck 312 folded, if desired, to their stowed and two-wheeled positions as shown in FIG. 15 to enable the hand truck to be used for other tasks than handling water containers.

The disclosed embodiments are representative of presently preferred forms of the invention, but are intended to be illustrative rather than definitive thereof. The invention is defined in the claims.

We claim:

1. In a convertible hand truck with a load carrying nose plate usable as a two wheeled product transporter and alternatively as a converted carrier with additional secondary wheel support, the hand truck having an elongate main frame assembly with a head end and a base end, and incorporaating a nose plate projecting generally perpendicularly from said base end; said main frame assembly having a main frame formed by elongate laterally spaced side rails connected by spaced lateral cross rails; an axle assembly with a pair of wheels thereon joined to said base end of said main frame assembly; handle surface for the head end of the main frame assembly; and an elongate subframe having a head end and a base end; a coupling assembly mounting the subframe on said main frame assembly to permit said main frame assembly is in two-wheeled cart configuration to a generally horizontal position generally perpendicular to the subframe, and a secondary wheel system horizontal position, the improvement comprising:

a. a support assembly supported by said base end of the main frame assembly providing an end support projecting outwardly generally perpendicularly to said elongate main frame assembly and having an outer and extending outwardly beyond said nose plate;

b. a longitudinally extending multiple container carrier tray structure for containers have cylindrical surfaces, having an operative position and, in said operative position, lying coextensively on said main frame assembly to be supported thereby when the main frame assembly is in generally horizontally disposed position, and having a series of transversely extending container accommodating, container supporting recesses in longitudinally spaced relation, said recesses being of only of such depth realitive to the diameters of said cylindrical surfaces and so longitudinally spaced as to leave the containers are exposed and have spaces between them in which cylindrically surfaced container providing a second tier of containers may be supported on said exposed surfaces, said tray structure being of such length longitudinally as to fit between said nosepiece and subframe when the hand truck assumes the generally horizontal position; and c. coupling mechanism for mounting was carrier tray structure to said main frame.

2. The hand truck of claim 1 wherein said tray structure is formed by a pair of transversely spaced tray side members having said recesses therein in transverse alignment.

3. The hand truck of claim 2 wherein said support assembly is pivotally fixed at its lower end to said main frame assembly and is of a transverse width to be received horizontally between said side mambers of said tray structure when pivoted down to said try structure.

4. The hand truck of claim 2 wherein said support assembly is pivotally fixed at its lower end to said tray structure and is of a transverse width to be received between said tray side rails when pivoted down.

5. The hand truck of claim 1 wherein said coupling mechanism comprises releasable resilient gripper legs on said tray structure for partially enveloping said main frame side rails, said legs having cam surfaces thereon for springing said legs to assist movement into enveloping position.

6. The hand truck of claim 2 wherein said main frame side rails have interior sides and hinge mechanisms on said main frame side rails connect to said tray structure side members to permit said tray side members to be swung individually from an upright position to a stowed position adjacent the interior sides of said main frame side rails.

7. The combination of claim 1 wherein said tray includes a rigid frame structure extending longitudinally between the base and head ends of the main frame and at least one end support extending upright from at least one end of said frame structure to provide support to a stack of containers on the tray.

8. The combination of claim 7 wherein said at least one end support is pivotally mounted on said tray and movable between a folded position in which said at least one end support lies generally flush with said frame structure, and said upright position in which said at least one end support extends generally perpendicularly upwardly from said frame structure.

9. The combination of claim 7 wherein said ay includes a pair of said end supports extending upright from both ends of said frame structure.

10. The combination of claim 9 wherein said end supports are foldable generally flush with said frame structure.

11. The combination of claim 10 wherein said end support adjacent said base end of said main frame engages and is supported upright at least in part by said nose piece.

12. The combination of claim 11 wherein said tray includes a stop and said end support adjacent said head end of said main frame confronts said stop when in said upright position.

13. The combination of claim 7 wherein said at least one end support includes a pair of laterally spaced rails.

14. The combination of claim 13 wherein said end support rails are spaced about 8–10 inches.

15. For use as a bottle carrier, a convertible hand truck usable as a two wheeled product transporter and alternatively as a converted carrier with additional secondary wheel support, the hand truck having an elongate main frame assembly with a head end and a base end, and incorporating a load carrying nose plate projecting generally perpendicularly from said base end; an axle assembly with a pair of wheels thereon joined to said base end of said main frame assembly; handle surface for the head end of the main frame assembly; an elongate subframe having a head end and a base end; a coupling assembly mounting the subframe on said main frame assembly to permit said main frame assembly to be shifted from a generally vertical disposition generally paralleling said subframe when the said main frame assembly is in two-wheeled cart configuration to a generally horizontal position generally perpendicular to the subframe, and a secondary wheel system for supporting said hand truck main frame assembly when said main frame assembly assumes the generally horizontal position, the improvement comprising:

a. an end support assembly connected with said nose plate providing an extension projecting outwardly generally perpendicularly to said elongate main frame assembly and having an outer end extending outwardly beyond said nose plate and providing a spaced distance between said end support assembly and subframe when said main frame assembly is in generally horizontal position;
   b. a longitudinally extending releasable multiple container tray structure having an operative horizontal position for carrying bottles having cylindrical surfaces. lying in said operative position upon said main frame assembly when the main frame assembly is in generally horizontal position to be supported thereby, said tray structure having a series of transversely aligned recessed surfaces for receiving and supporting the weight of a first tier of side-by-side bottles, said recessed surfaces being of such a depth relative to the diameters of said bottles and so longitudinally spaced as to leave the bottles in an abutting relationship having exposed bottle surfaces which can support a second tier of like bottles between them, said tray structure being of such length relative to said spaced distance and said recessed surfaces being so longitudinally spaced that said first tier of bottles and a third tier supported by said second tier are in substantially abutting engagement with and prevented from displacement by said subframe and said end support assembly; and
   c. coupling mechanism for connecting said main frame assembly and tray structure when said main frame assembly is in generally horizontal disposition to provide stable support for said tiers of bottles.

16. A method of assembling a convertible hand truck, usable in generally vertical two wheel configuration and in generally horizontal disposition with secondary wheel support, said hand truck having an elongate main frame assembly with a head end and a base end, and having a main frame defined by side rails connected by cross rails, a pair of axle-supported wheels connected to said base end of said main frame assembly, the main frame assembly incorporating a load transporting nose plate at its said base end extending generally perpendicularly outwardly beyond said main frame assembly; an elongate subframe; a coupling assembly mounting the subframe on said main frame assembly to permit said main frame assembly to be shifted from a position generally paralleling said subframe when the said main frame assembly is in two-wheeled cart configuration to a generally horizontal position generally perpendicular to the subframe; and a secondary wheel system supporting the main frame assembly when the main frame assembly assumes the generally horizontal position comprising:

a. providing an end support assembly, to be supported adjacent the nose plate to provide an extension having an outer end projecting outwardly beyond said nose plate and defining a spaced distance between said end support assembly and subframe when the main frame assembly is in generally horizontal position;
   b. providing a longitudinally extending releasable multiple container tray structure, for carrying bottles having cylindrical surfaces, lying on said main frame when the main frame assembly is in generally horizontal position to be supported thereby, said tray structure having a series of transversely aligned longitudinally spaced recessed surfaces for receiving and supporting the weight of a first tier of side-by-side bottles, said recessed surfaces being of such a depth relative to the diameters of said bottles and so longitudinally spaced as to leave the bottles in an abutting relationship having exposed bottle surfaces which can support a second tier of like bottles between them, said tray structure being of such length relative to said spaced distance and said recessed surfaces being so longitudinally spaced that said first tier of bottles and a third tier supported by said second tier are substantially in abutting engagement with said subframe and said end support assembly;
   c. providing releasable coupling mechanism for connecting said main frame assembly and tray structure when said main frame assembly is in generally horizontal disposition to provide stable support for said tiers of bottles; and
   d. demountably coupling said tray structure with main frame.

17. The method of claim 16 comprising providing spring gripper legs, and camming surfaces for spreading them, on said tray structure, and pressing said camming surfaces against said main frame assembly side rails to deform said legs and permit them to partially envelop and releasably secure to said side rails.

18. The method of claim 16 wherein said main frame assembly side rails have interior sides and providing said tray structure as transversely spaced tray side rails with hinge mechanisms on the tray side rails connected to said main frame side members to permit said side members to be swung individually from an upright position to a stowed position adjacent the interior sides of said main frame side rails.

19. The method of claim 16 including stacking said tiers of said bottles of said diameter on said tray structure for transport.

* * * * *

UNITED STATES PATENT AND TRADEMARK OFFICE
CERTIFICATE OF CORRECTION

PATENT NO.    : 6,302,414 B1
DATED         : October 16, 2001
INVENTOR(S)   : William Berthiaume, Brian W. Law and Kenneth A. Kukla It is certified that error appears in the above-identified patent and that said Letters Patent is hereby corrected as shown below:

Column 5,
Line 15, change "acurate" to -- arcuate --.

Column 7,
Line 34, change "acurate" to -- arcuate --.

Column 9,
Line 32, change "incorporaating" to -- incorporating --;
Line 41, after "assembly" insert -- to be shifted from a generally vertical disposition generally paralleling said subframe when the same main frame assembly --;
Line 43, after "system" insert -- supporting the hand truck when it assumes the generally --;
Line 54, before "assembly" insert -- between said base end and said head end of said main frame --;
Line 59, change "realitive" to -- relative --;
Line 61, after "containers" insert -- in a first tier in a side-by-side relationship in which the upper portions of said cylindrical surfaces of said containers --;
Line 62, change "container" to -- containers --.

Signed and Sealed this

Twenty-seventh Day of August, 2002

Attest:

JAMES E. ROGAN
Attesting Officer            Director of the United States Patent and Trademark Office